United States Patent
Hellerstein et al.

(10) Patent No.: US 7,137,019 B2
(45) Date of Patent: Nov. 14, 2006

(54) ADAPTIVE THROTTLING SYSTEM FOR DATA PROCESSING SYSTEMS

(75) Inventors: Joseph L. Hellerstein, Ossining, NY (US); Matthew Huras, Ajax (CA); Sam Lightstone, Toronto (CA); Sujay S. Parekh, New York, NY (US); Kevin R. Rose, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 516 days.

(21) Appl. No.: 10/427,009

(22) Filed: Apr. 30, 2003

(65) Prior Publication Data

US 2004/0221184 A1 Nov. 4, 2004

(51) Int. Cl.
G06F 1/32 (2006.01)
G06F 9/44 (2006.01)

(52) U.S. Cl. ..................... 713/323; 718/104

(58) Field of Classification Search ........ 713/300–340; 718/104, 105
See application file for complete search history.

(56) References Cited

U.S. PATENT DOCUMENTS

| 4,807,161 | A | | 2/1989 | Comfort | |
|---|---|---|---|---|---|
| 5,428,789 | A | * | 6/1995 | Waldron, III | 718/103 |
| 6,205,468 | B1 | * | 3/2001 | Diepstraten et al. | 718/108 |
| 6,834,386 | B1 | * | 12/2004 | Douceur et al. | 718/107 |

FOREIGN PATENT DOCUMENTS

| JP | 7191733 | 7/1995 |
|---|---|---|
| JP | 9212392 | 8/1997 |
| WO | WO9710543 | 3/1997 |
| WO | WO0020939 | 4/2000 |

OTHER PUBLICATIONS

Brown J C, "A Critical Overview of Computer Performance Evaluation", Departments of Computer Sciences and Physics and The Computation Center, The university of Texas at Austin, Austin, Texas 78712, 1978.

Shan H, et al., "A Comparison of Three Programming Models for Adaptive Applications on the Origin2000", 2000 IEEE.

Brice R S, et al., "Feedback Coupled Resource Allocation Policies in the Multiprogramming-Multiprocessor Computer System", ACM, Aug. 1978, vol. 21, No. 8.

INSPEC: Knudson M E, "A performance measurement and system evaluation project plan proposal", ACM SIGMETRICS—Peformance Evaluation Review, v. 13, No. 1, Jun. 1985.

(Continued)

Primary Examiner—Dennis M. Butler
(74) Attorney, Agent, or Firm—Mark S. Walker; Gregory K. Goshorn; Greg Goshorn, P.C.

(57) ABSTRACT

An adaptive throttling system for minimizing the impact of non-production work on production work in a computer system. The adaptive throttling system throttles production work and non-production work to optimize production. The adaptive throttling system allows system administrators to specify a quantified limit on the performance impact of non-production or utility work on production work. The throttling rate of the utility is then automatically determined by a supervisory agent, so that the utilities' impact is kept within the specified limit. The adaptive throttling system adapts dynamically to changes in workloads so as to ensure that valuable system resources are well utilized and utility work is not delayed unnecessarily.

24 Claims, 8 Drawing Sheets

OTHER PUBLICATIONS

Feinberg D A, et al "Software Development Facilties for Embedded Computer Systems", Conference on Software Tools, Apr. 15-17, 1985, NY, IEEE.

Carrasco J A, et al, "METFAC: Design and implementation of a Software Tool for Modeling and Evaluation of Complex Fault-Tolerant Computing Systems", FTCS 16th Annual International Symposium, Digest of Papers, Vienna, Austria, Jul. 1-4, 1989, IEEE 86CH2335-8, ISBN 0-8186-0703-3, ISSN 0731-3071.

TDB: vol. 39, No. 7, Dec. 1989, "Multi-Station Application Test System", pp. 3159-3163.

RD; Feb. 2000, Article 430146—UNK cleaner—Lotus notes design garbage collector & remover pp. 258-361.

RD: Jul. 2000, Article 435177—Graphic congestion control system for store systems, pp. 1315-1318.

* cited by examiner

ADAPTIVE THROTTLING SYSTEM FOR DATA PROCESSING SYSTEMS

FIELD OF THE INVENTION

The present invention relates to data processing systems in general, and more particularly to an adaptive throttling system for use in data processing systems.

BACKGROUND

Work performed by modern computer systems may be considered to fall into two categories: (1) production work which is directly related to the users or purpose of the system; and (2) other work, such as tasks that are less important or those that are essential to the long-term functioning and health of the system. Non-production work in this context includes utilities, low priority applications, low priority functions within an application, and also low priority users using the system, for example, a user generating a mining report in a database application. For convenience, in the rest of this document, non-production work is referred to as "utility work". Some examples of utility work include garbage collection, running anti-virus software, performing system backups, etc. Utility work is usually considered to be lower-priority when resolving contention for resources, such as CPU, memory, bandwidth, etc. Unfortunately, resource prioritization schemes in modem operating systems do not fully address the issue of arbitrating resource contention. For example, Unix systems allow process priorities to control CPU contention, but contention for other resources, e.g. I/O, memory, etc., are not arbitrated. Hence, the execution of non-production work on a well-utilized system will generally degrade the performance of the production work due to such contention and other overheads introduced by running the utilities.

One approach to overcome the foregoing problems is for the system administrator to carefully plan the execution of utility work during periods when the production work is low or when the system is offline. This approach is problematic because: (a) it requires a large expenditure of time and effort of the system administrator; (b) not all utilities can be deferred until such a period; (c) the window of execution may be too short for the utility to complete its tasks or perform its tasks properly; and (d) in modern 24×7 operation, such low or offline periods may be absent.

Another approach is to "throttle" utility work to a variable extent. In the context of this work, throttling refers to a lowering of the utility's rate of progress or resource consumption. For example, one may limit the rate at which memory is scanned by a garbage collector, or the I/O bandwidth consumed by a system backup. By throttling utilities to a larger extent, a system administrator may limit the impact of utilities on production work, thereby allowing the system administrator to run the utility along with production work.

A drawback of the throttling approach described above is that the progress of utility work may be unnecessarily impacted, if the throttling level is too high when the production low is low. System administrators have generally competing objectives: (1) ensuring that utilities are throttled sufficiently to prevent undue impact on production work; and (2) ensuring that managed systems are well utilized and/or that utilities finish within an acceptable time. The workload of most commercial systems varies with time, thus it is desirable to change the throttling level in response to changing workloads to optimize system resource allocation. When the production load is high the utilities should be throttled more, but when production load is low the utilities should be throttled less. Moreover, utilities which have little or no impact on the production work may not need to be throttled much or at all. However, manually adjusting throttling levels to the appropriate level is labor-intensive and error-prone, thereby raising the costs of ownership of the system.

In view of these shortcomings, there exists a need for autonomically controlling the rate of execution of non-production work in a computer system.

SUMMARY

The present invention provides an adaptive throttling system for reducing the impact of non-production work on production work in data processing systems.

In accordance with one aspect of the present invention, there is provided for a data processing system, a method for execution of programs for performing production work and utility work, the data processing system is operatively coupled to memory for storing data, the method comprises the steps of: selecting a performance impact limit of the utility work on the production work; throttling tasks associated with the utility work based on a throttling level; collecting performance data for the data processing system; determining a performance impact of the utility work on the production work; and adjusting the throttling level if the performance impact is more than the performance impact limit.

In accordance with another aspect of the present invention, there is provided a computer program product having a computer readable medium tangibly embodying code for directing a data processing system to execute programs for performing production work and utility work, the data processing system is operatively coupled to memory for storing data, the computer program product comprises: code for selecting a performance impact limit for the utility work on the production work; code for throttling tasks associated with the utility work according to a throttling level; code for collecting performance data for the data processing system; code for determining a performance impact of the utility work on the production work; and code for adjusting the throttling level if the performance impact is above the performance impact limit.

In accordance with a further aspect of the present invention, there is provided a data processing system for optimizing execution of computer programs, the data processing system is operatively coupled to memory for storing data and the execution of the computer programs includes performing production work and utility work, the data processing system comprises: means for selecting a performance impact limit of the utility work on the production work; means for throttling tasks associated with the utility work according to a throttling level; means for collecting performance data associated with the data processing system; means for determining a performance impact of the utility work on the production work based on the collected performance data; and means for adjusting the throttling level if the performance impact is above the performance impact limit.

In yet another aspect, the present invention provides a computer data signal embodied in a carrier wave and having means in the computer data signal for directing a data processing system to execute computer programs for performing production work and utility work, the data processing system is operatively coupled to memory for storing data, the computer data signal comprises: means in the computer data signal for selecting a performance impact limit of the utility work on the production work; means in the computer data signal for throttling tasks associated with the utility work according to a throttling level; means in the computer data signal for collecting performance data associated with the data processing system; means in the computer data signal for determining a performance impact of the utility work on the production work based on the collected performance data; and means in the computer data signal for adjusting the throttling level if the performance impact is more than the performance impact limit.

In accordance with another aspect of the invention, there is provided, for a data processing system, a method for execution of programs for performing a primary work type and a secondary work type, the method including throttling tasks associated with the secondary work type based on a throttling level; and, adjusting the throttling level based on a performance impact of the secondary work type on the primary work type.

In accordance with yet another aspect of the invention, there is provided a data processing system for execution of programs for performing a primary work type and a secondary work type, the data processing system including means for throttling tasks associated with the secondary work type based on a throttling level; and, means for adjusting the throttling level based on a performance impact of the secondary work type on the primary work type.

In accordance with yet another aspect of the invention, there is provided a computer program product having a computer readable medium tangibly embodying computer executable code for directing a data processing system to execute programs for performing a primary work type and a secondary work type, the computer program product including code for throttling tasks associated with the secondary work type based on a throttling level; and, code for adjusting the throttling level based on a performance impact of the secondary work type on the primary work type.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Reference will now be made to the accompanying drawings which show, by way of example, preferred embodiments of the present invention, and in which.

DETAILED DESCRIPTION OF THE EMBODIMENTS

The following detailed description of the embodiments of the present invention does not limit the implementation of the invention to any particular computer programming language. The present invention may be implemented in any computer programming language provided that the OS (Operating System) provides the facilities that may support the requirements of the present invention. A preferred embodiment is implemented in the C or C++ computer programming language (or other computer programming languages in conjunction with C/C++). Any limitations presented would be a result of a particular type of operating system, computer programming language, or data processing system and would not be a limitation of the present invention.

Figure 1:
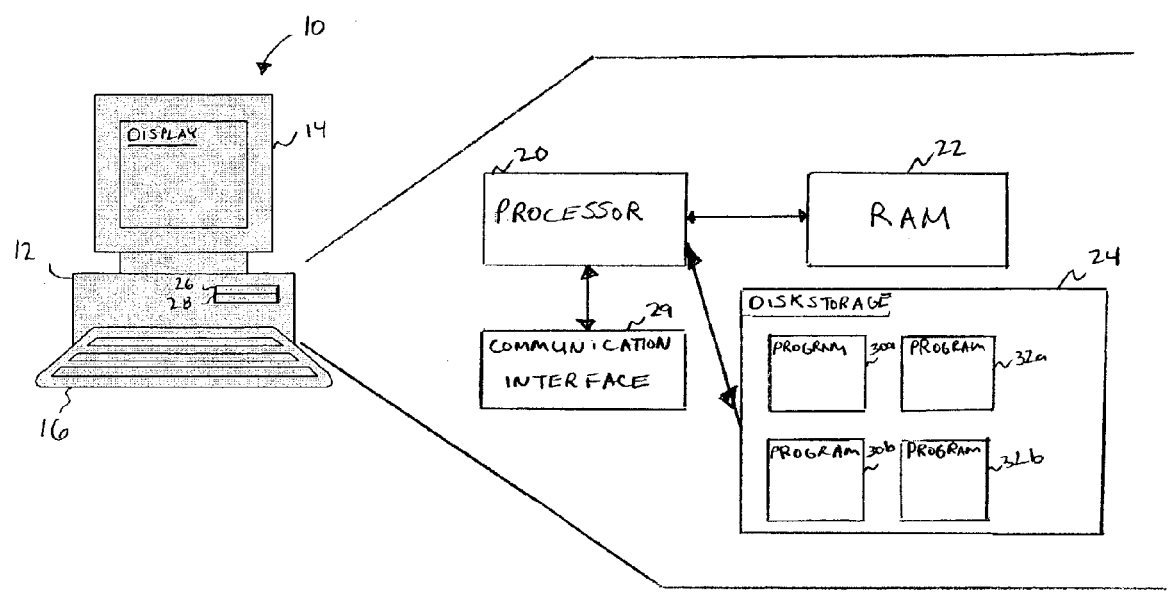
FIG. 1 is a schematic diagram of a data processing system suitable for utilizing the present invention.

Reference is first made to FIG. 1 which shows in diagrammatic form a computer system indicated by reference 10 for operating an adaptive throttling system in accordance with an embodiment of the present invention.

The computer system 10 as shown in FIG. 1 includes a processing unit 12, a display unit 14, and a keyboard 16 and other input devices such as a mouse (not shown). The processing unit 12 is configured in a conventional manner and includes one or more processors 20, random access memory or RAM 22, and mass storage devices, such as a hard disk drive 24, a compact disk or CD drive 26, a floppy disk drive 28, and a communication interface 29. It will be appreciated that the adaptive throttling system 10 is suitable for use on other types of computer or data processing systems, for example, on a back-end server which is configured in the same manner as the computer system 10 shown in FIG. 1, as will be understood by those skilled in the art.

The computer system 10 may be coupled to a network (not shown) via the communication interface 29. The communication interface 29 may comprise a wireless link, a telephone communication, radio communication, computer network (e.g. a Local Area Network (LAN) or a Wide Area Network (WAN)), or a connection through the Internet or World Wide Web (WWW). Computer programs for performing production work or production programs 30, indicated individually by references 30a, 30b, and computer programs for performing utility (non-production) work or utility programs 32, indicated individually by references 32a, 32b are installed on the hard disk drive 24. The computer program product 30 may include application programs such as the DB2™ database management system from IBM. The computer program product 32 may include utility programs such as garbage collection software, anti-virus software, or system backup software. Alternatively, the software performing the production work and the utility work may be the same. The criterion is that the production work and the utility work are distinguishable at execution time, such as by running in separate processes or threads.

In the context of the description, work refers to processing and resource consumption that occurs in any piece of the entire computer or data processing system. Production work includes work that occurs directly on behalf of end-users of the data processing system or is otherwise directly related to the purpose of the system. Utility or non-production work refers to any maintenance or background work. Examples of non-production work or utility work include utilities, low priority applications, low priority functions within an application, and also low priority end-users using the system, e.g., a user generating a mining report in a database application.

The adaptive throttling system according to this aspect of the invention may be implemented within a computer program product 30 for an application which runs on the computer or data processing system 10 or in a separate utility program 32 which runs on the computer system 10. In operation, the computer programs 30 and 32 are loaded from memory 24 and program instructions are generated for execution by the processor 20.

Figure 2:
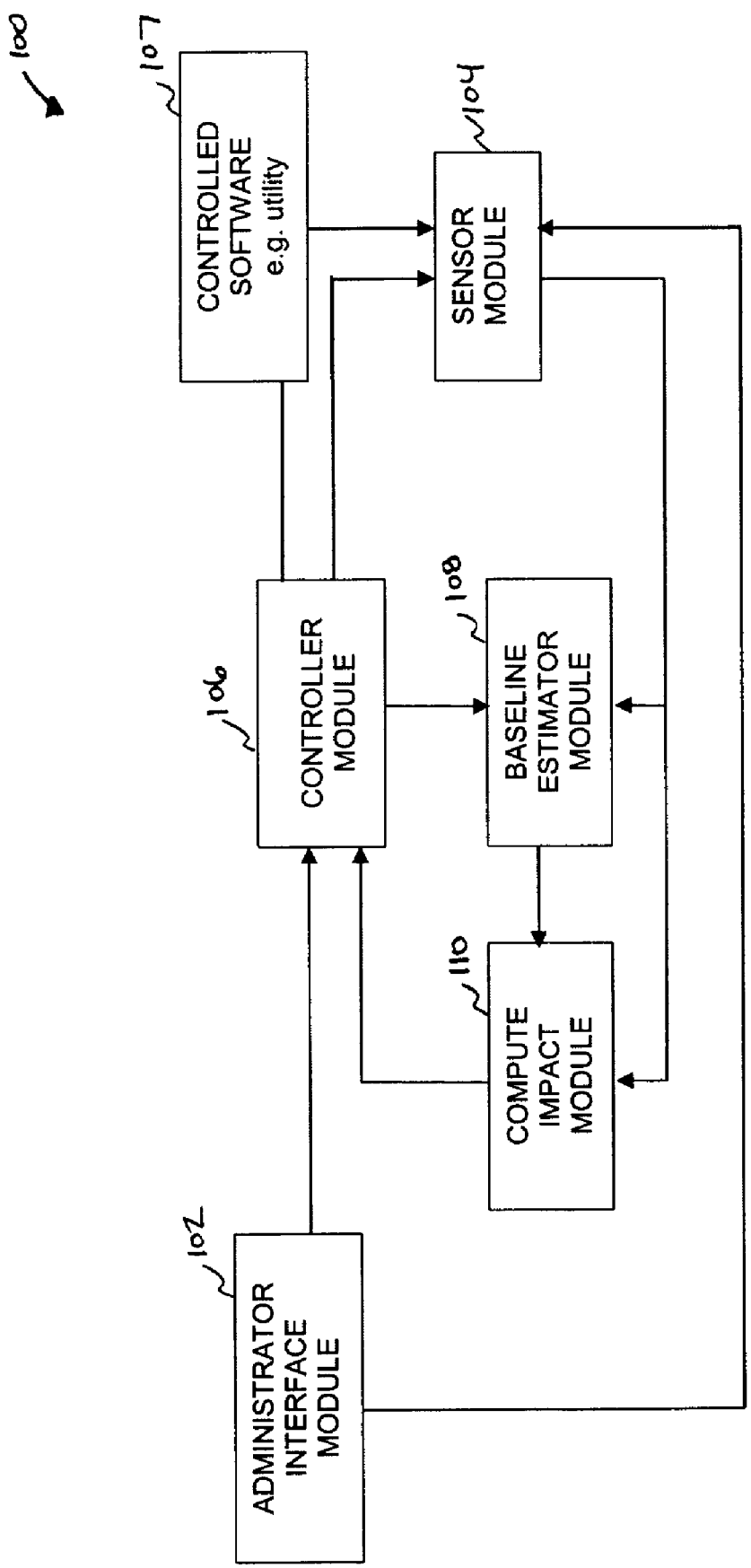
FIG. 2 is a block diagram of an embodiment for implementing an adaptive throttling system according to the present invention.

Reference is now made to FIG. 2 which shows an implementation for an adaptive throttling system 100 according to an aspect of the present invention. The adaptive throttling system 100 is implemented in functional modules in the form of computer software or a computer program product 30 and executed by the processor 20 during operation of the computer program product 30. The adaptive throttling system 100 comprises an administrator interface module 102, a sensor module 104, a controller module 106, a baseline estimator module 108, and a compute impact module 110.

The administrator interface module 102 is a functional module for performing configuration functions, including selecting a performance metric of interest and the quantified bound or limit on the performance metric of interest. This quantified bound comprises a performance impact limit.

The sensor module 104 is a functional module for measuring the performance of the computer system 10 in terms of the performance metric of interest. The sensor module 104 provides data measured for the performance metrics of interest about the computer system 10 to the baseline estimator module 108 and the compute impact module 110.

The controller module 106 is a functional module for calculating a throttling level for the utilities or the non-production work. The throttling level for each utility quantifies the reduction in execution rate or resource consumption of a utility. Typically, it is a value between 0% and 100%, where 0% indicates no reduction, and 100% indicates the utility makes no progress and/or consumes no resources. The software, e.g. the utility, controlled by the controller module is represented by reference 107.

The baseline estimator module 108 is a functional module for observing the throttling level and its impact on the selected performance metric of interest, and calculating a baseline for the computer system 10. The baseline is an estimate, in terms of the specified performance metric, of what the performance of the computer system 10 would be if the utility programs 32 were not operating.

The compute impact module 110 is a functional module for comparing the current performance to the current baseline, and calculating a current performance impact due to utility work. The performance impact is the difference between the current performance and the current baseline. This difference can be represented as the raw difference or as a percentage relative to the baseline. The performance impact is then submitted to the controller module 106.

Figure 3:
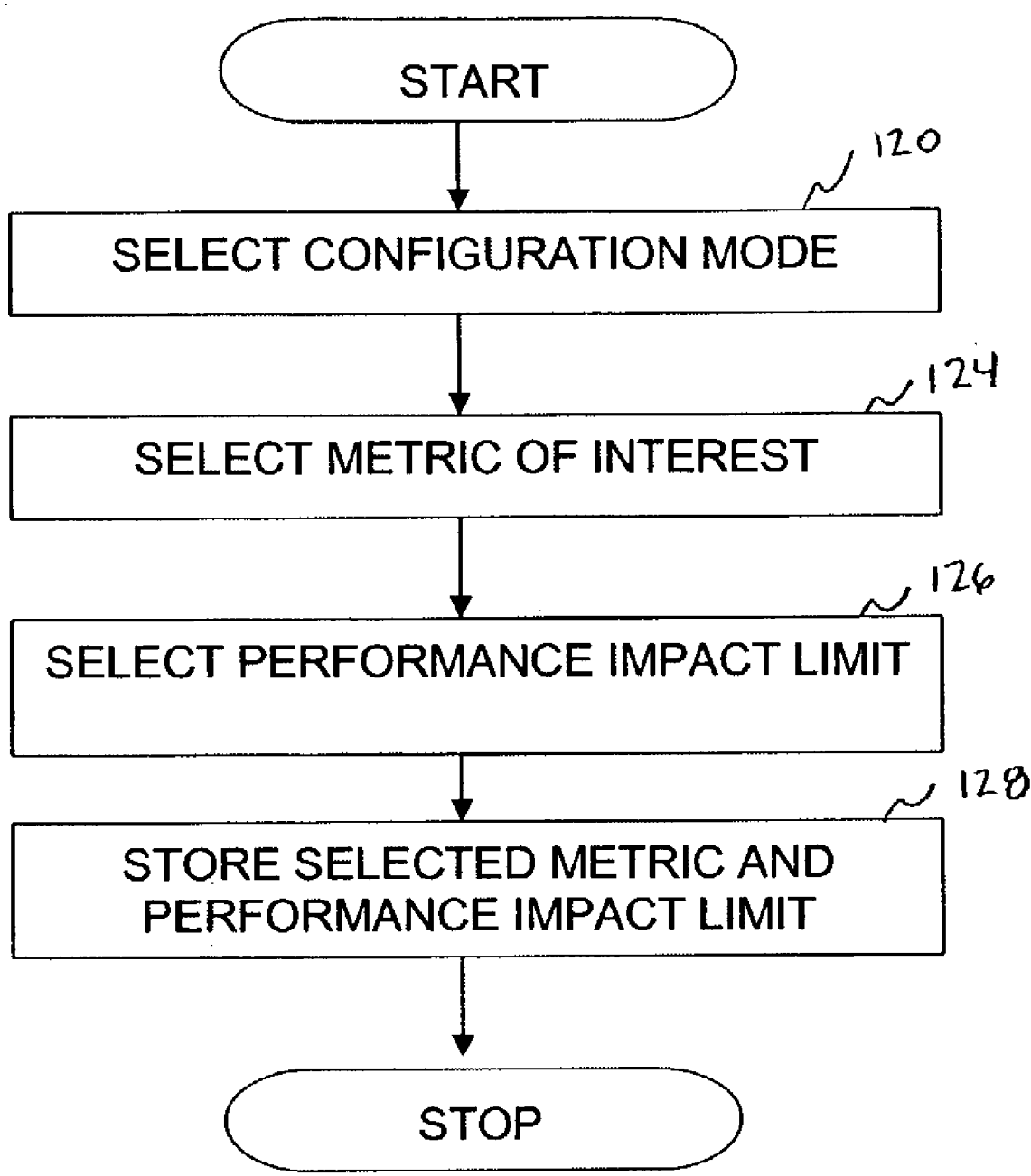
FIG. 3 is a flowchart of the operation of an administrator interface module for the adaptive throttling system of FIG. 2.

Reference is now made to FIG. 3, which shows the operation of the administrator interface module 102 in more detail. The administrator interface module 102 allows the system administrator to select the performance metric of interest and specify in quantified terms of that performance metric how much impact on production work is to be allowed by utility work. Typical performance metrics include throughput, queue lengths, service time, CPU time, I/O, memory, or in DB2™ the buffer pool page fix rate. As shown in FIG. 3, the first step 120 in the operation of the administrator interface module 102 is to select the configuration mode of the administrator interface module 102. The user is then prompted to enter the performance metric of interest (step 124). The available performance metrics are preferably displayed in a list or other suitable form so that the administrator knows which performance metrics are available before making their selection. The user is then prompted to select a performance impact limit for the selected performance metric of interest (step 126). The performance impact limit may be specified as a percentage (%) of the selected performance metric or absolutely in terms of the selected performance metric. The administrator interface module 102 then stores the selected performance metric and the associated performance impact limit in memory (step 128), e.g. in RAM, so that the information may be later accessed by the functional modules of the adaptive throttling system 100. It will be appreciated that the effectiveness of the adaptive throttling system will vary according to the selected performance metric of interest as some performance metrics will have a greater impact on performance than others. Further, it should be appreciated that the administrator interface module 102 may also be used to allow the administrator to adjust other parameters specific to the detailed implementation of the other modules described. For example, if the controller module 106 computes a throttling level on a periodic basis, the administrator module 102 may be used to allow the administrator to set the period T at which such adjustments are made.

The operation of the administrator module 102 is described in further detail by way of the following example. If the performance of the computer system 10 in steady-state without utility work, i.e. with only production work, is p, in terms of the performance metric of interest, for example, 100 kps, and the administrator specifies a performance impact limit of m %, for example, 5% in step 126, then the computer system 10 will throttle the utility work so that the performance of the system 10 with both the production and utility work concurrently running is no lower than p*m % (e.g. 95 kps). In this example a higher p value translates to better performance for the selected metric. However, for some metrics such as response time a lower p value indicates better performance. Where a lower p value indicates better performance or when the performance impact limit is specified in absolute terms the computer system 10 throttles the utility work accordingly.

Figure 4:
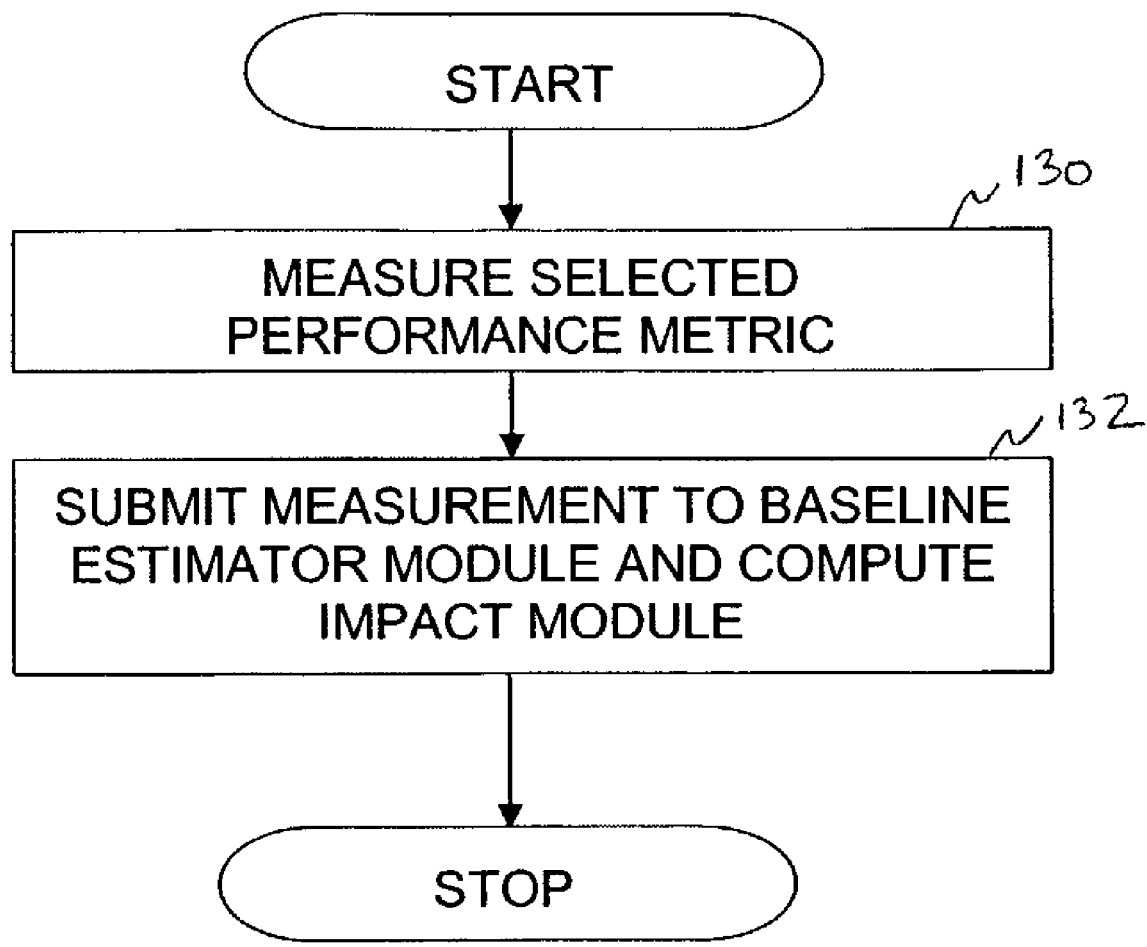
FIG. 4 is a flowchart of the operation of a sensor module for the adaptive throttling system of FIG. 2.

Reference is next made to FIG. 4, which shows the operation of the sensor module 104 in more detail. The sensor module 104 receives information regarding which metric is of interest from the administrator interface module 102. In the first step 130, the sensor module 104 measures the selected performance metric of interest for the computer system 10. The sensor module 104 then submits the measured performance data associated with the performance metric to the baseline estimator module 108 and to the compute impact module 110 (step 132). The measured data provides the control utility 100 with performance feedback so that any required corrections can be made. As described above, the administrator interface module 102 allows the administrator to choose the performance metric of interest but this metric must necessarily be measurable by the sensor module 104. The sensor module 104 may measure a variety of performance metrics relating to the computer system 10 including throughput, queue lengths, service time, CPU time, I/O, memory, or in DB2™ the buffer pool page fix rate. In networked applications such as DB2™, the system administrator may also be able to select between server-side metrics (such as server-side service time, throughput, etc.) and client-side metrics (such as client-side response time). In such applications, server-side metrics are preferable to that of client-side metrics. Generally, server-side metrics are more measurable than client-side metrics. Moreover, client-side metrics may include other factors which are not affected by throttling. The sensor module 104 should be configured to measure server-side metrics which are measurable without introducing significant overhead. Typically, the metric will be averaged over a specified time interval, e.g. throughput or mean response time over a 15 second interval. The sensor reports these measurements periodically as determined by the time interval, e.g. every 15 seconds.

In the DB2™ database management product, for example, the buffer pool page fix rate is preferable to other performance metrics as a measure of instance (or database manager) performance. A buffer pool is the amount of main memory allocated to cache table and index data pages as they are being read from disk, or being modified. The purpose of the buffer pool is to improve system performance. Data can be accessed much faster from memory than from disk, thus the fewer times the database manager needs to read from or write to a disk (I/O) the better the performance. A page fix occurs when a page is created or loaded into the buffer pool. The rate of page fixes may be easily influenced by either I/O or CPU contention making the page fix rate an effective general purpose indicator of instance performance. Furthermore, the buffer pool page fix rate may be used as a metric for both transaction-oriented production systems as well as for back-end decision support queries which are longer-running.

Figure 5:
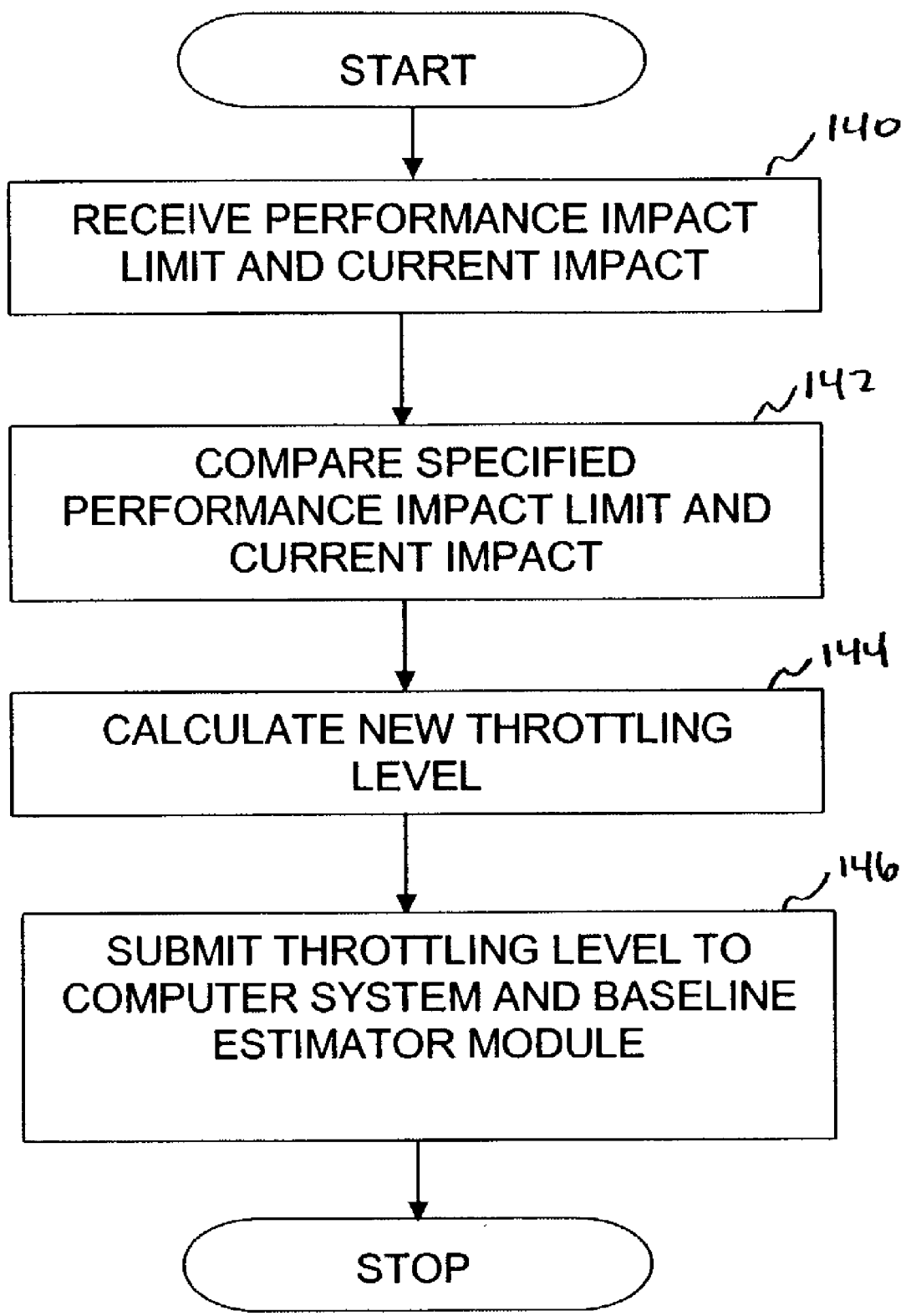
FIG. 5 is a flowchart of the operation of a controller module for the adaptive throttling system of FIG. 2.

The operation of the controller module 106 is now described in more detail with reference to FIG. 5. Preferably, the controller module 106 operates on a periodic basis, i.e. every T seconds, as determined by the system designer. The controller module 106 may be implemented as a proportional-integral (PI) controller. PI controllers are typically robust and offer wide applicability. Any other types of controllers, such as proportional-derivative (PD) or proportional-integral-derivative (PID) or neural-network based ones, for example, may be used. Also, it is feasible to use controllers that are driven by events other than timer events, for example, by the arrival of specific requests, or based upon having processed a fixed number of requests. The particular choice is specific to the target computer system and is chosen by the system administrator. In the first step 140, the controller module 106 requests the performance impact for the previous period from the compute impact module 110. Next the controller module 106 uses this information as well as the performance impact limit from the administrator interface module 102 to calculate a new throttling level (steps 142, 144) for each executing utility. The new throttling level is submitted to the target computer system 10 and to the baseline estimator module 108 (step 146). The computer system 10 uses the throttling level to change the resource consumption or rate of progress of utility tasks, and thus keep the impact from utility work within the desired limits. Preferably, the system 10 employs an enforced sleep mechanism. An enforced sleep mechanism is preferable because it is easily applied to a wide variety of tasks and it provides an adequate means for regulating the consumption of a wide range of resources including I/O, CPU and network bandwidth.

Figure 6:
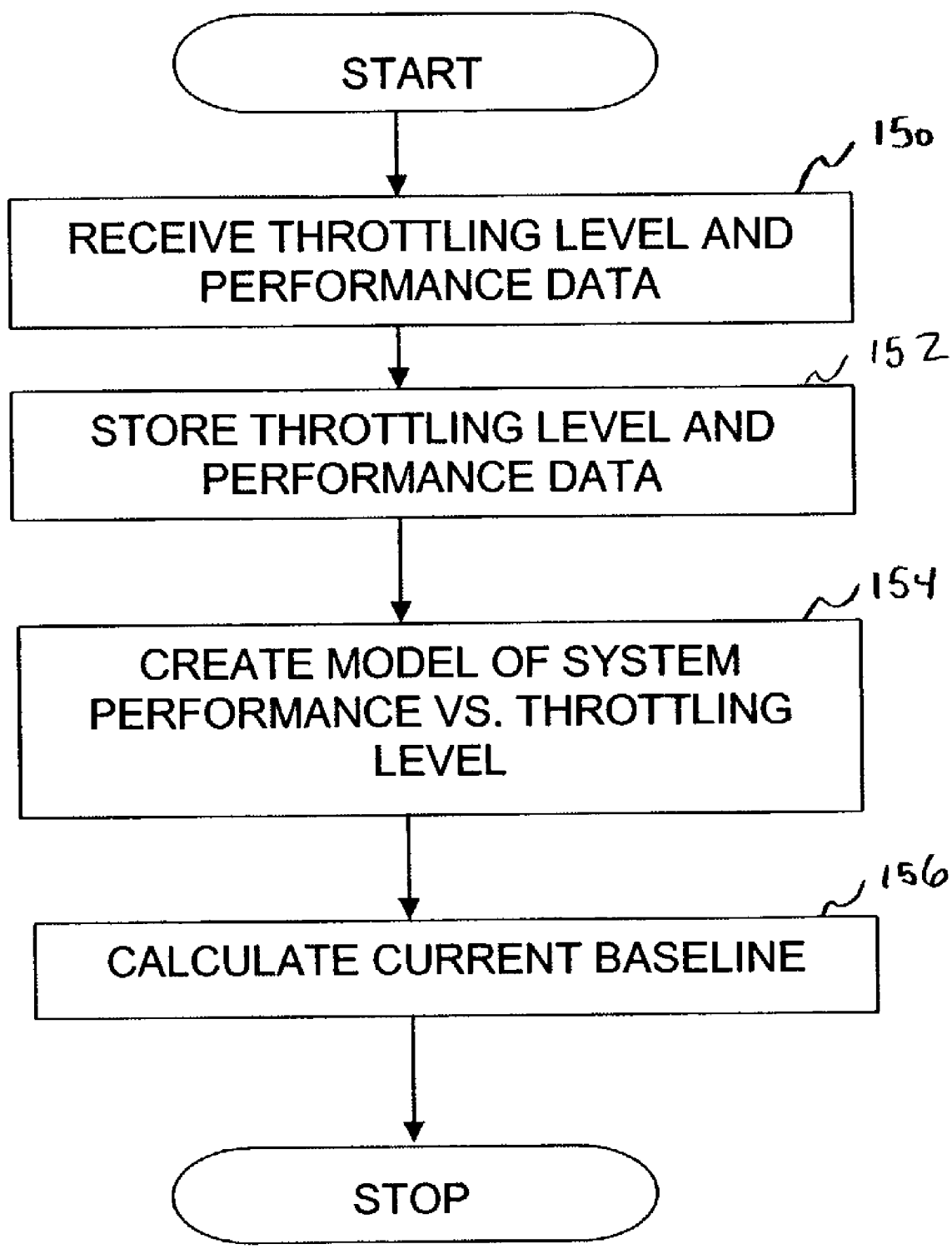
FIG. 6 is a flowchart of the operation of a baseline estimator module for the adaptive throttling system of FIG. 2.

Reference is next made to FIG. 6, which shows in more detail the operation of the baseline estimator module 108. In the first step 150, the baseline estimator module 108 receives data regarding the throttling level and current system performance data from the controller module 106 and the sensor module 104 respectively. The baseline estimator module 108 continually observes the throttling level and its impact on the performance metric chosen by the administrator. This data forms a record or tuple of the form <throttling level, performance> which is stored in memory (step 152), for example in RAM for the data processing system 10 (FIG. 1). The baseline estimator module 108 then analyzes the stored historical data and the data collected in the current period to develop a mathematical function describing how system performance is currently being affected by the throttling level (step 154). The baseline estimator module 108 may perform adaptive curve fitting using the recursive least squares method with exponential forgetting to fit a model to these data points. Recursive least squares with exponential forgetting is a curve fitting algorithm known in the art. Other curve fitting methods providing similar capabilities may be used. Next in step 156, the baseline estimator module 108 uses the function developed in step 154 to calculate what the system performance would be if the throttling level was at 100% for all utilities, i.e. if no utilities were operating. This value becomes the current baseline. The baseline estimator module 108 submits the current baseline to the controller module 106.

The adaptive estimation operation as described above allows the adaptive throttling system 100 to dynamically adapt to changing workloads of production and/or utility work. If the functional relationship between the throttling rate and the selected performance metric of interest changes over time, the baseline estimator module 108 will learn the new function which describes this relationship. The baseline estimation scheme employed by the baseline estimator module 108 also avoids the need to measure utility tasks' impact on performance. This type of measurement requires some method to quantify the performance of the instance as if the utility work was not executing. For example, this can be accomplished by suspending all processes relating to the utility work. However, this is not always feasible and even if it is, it unnecessarily introduces synchronization and causes utility work to be slowed down. The baseline estimator module 108 according to this aspect of the invention avoids synchronization by estimating the baseline instead of measuring it.

Figure 7:
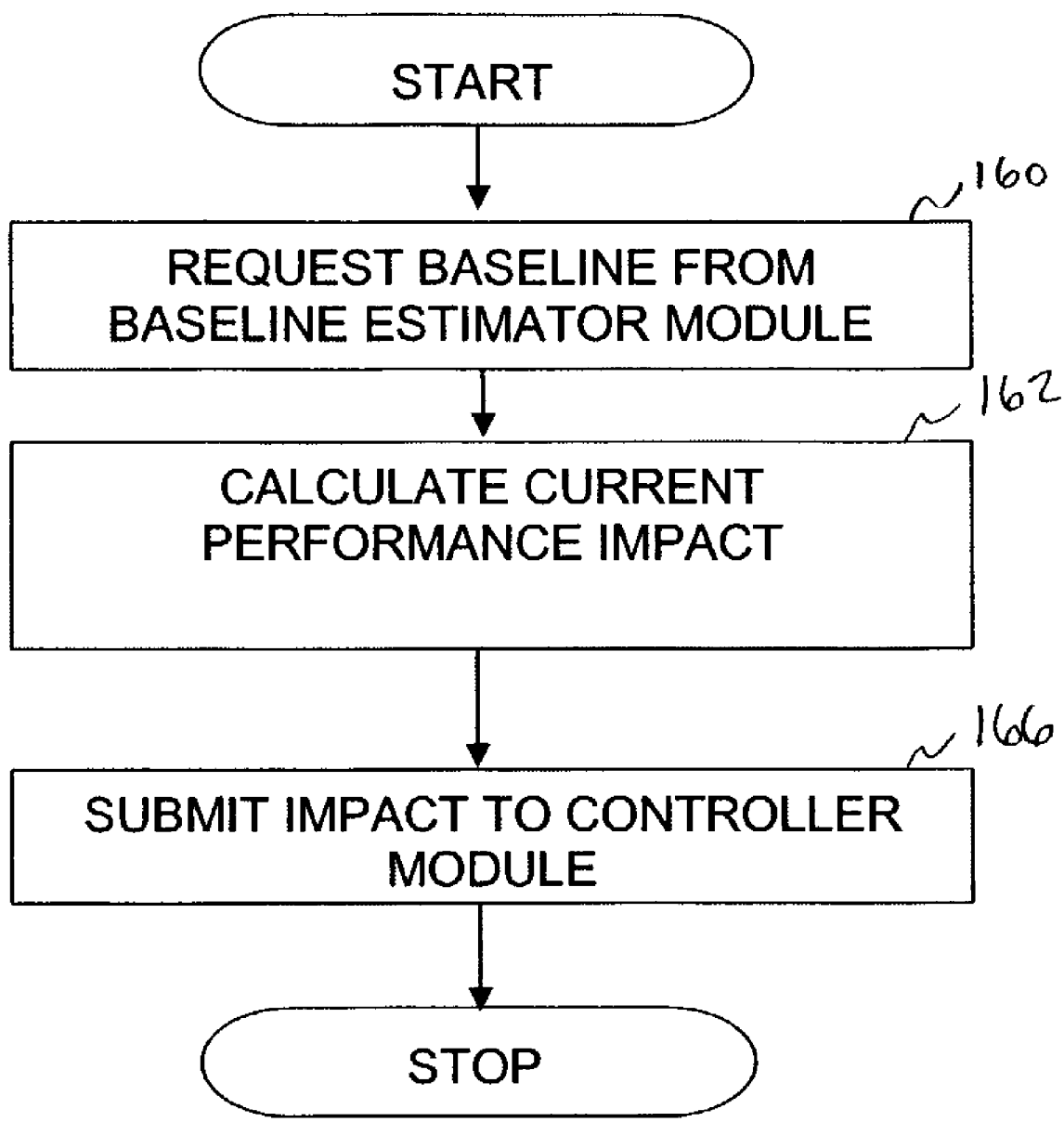
FIG. 7 is a flowchart of the operation of a compute impact module for the adaptive throttling system of FIG. 2.

Reference is next made to FIG. 7, which shows the operation of the compute impact module 110 in more detail. First in step 160, the compute impact module 110 receives the current baseline and the current performance data from the baseline estimator module 108 and the sensor module 104 respectively. Next in step 162, the current performance impact due to utility work is calculated as the % difference (could also be the raw difference) between the current performance, as measured by the selected performance metric, and the current baseline. The performance impact is then submitted to the controller module 106 (step 166), whenever the controller module 106 requests it.

Figure 8:
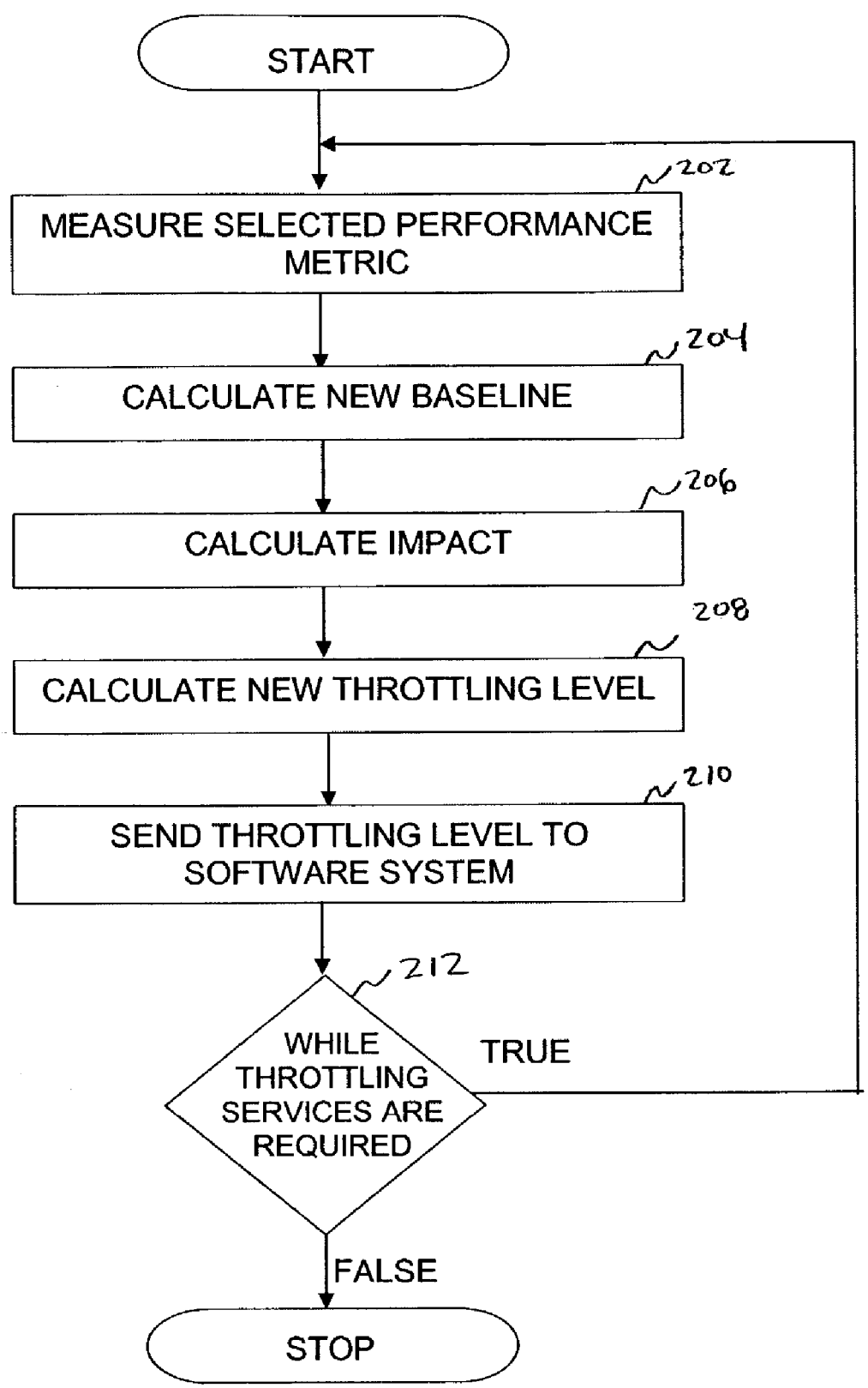
FIG. 8 is a flowchart of the overall operation of the adaptive throttling system of FIG. 2.

Reference is made to FIG. 8, which shows the major operational steps of the adaptive throttling system 100. The sensor module 104 measures the selected performance metric of the system at the current throttling level (step 202). Next in step 204, the baseline estimator module 108 calculates the baseline using stored historical data and the data collected in the current period. The compute impact module 110 then calculates the current impact using the current baseline and the current performance data (step 206). The compute impact module 110 then submits the current impact to the controller module 106 (step 208) where it is used to generate a new throttling level in the next period. The controller module 106 then sends the throttling value to the software program or system 107 (FIG. 2) and the baseline estimator module 108 (step 210). The process is repeated while throttling services are required as indicated by decision block 212.

In terms of implementation, the adaptive throttling system according to an aspect of the present invention can be used by any computer program product such as the database management application program sold under the DB2™ name from IBM. Furthermore, the adaptive throttling system can be implemented in computer programs running one single processor or multiprocessor computer platforms, and in networked or standalone applications.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. For a data processing system, a method for execution of programs for performing production work and utility work, said data processing system being operatively coupled to memory for storing data, said method comprising the steps of:
   selecting a performance impact limit of the utility work on the production work;
   throttling tasks associated with the utility work based on a throttling level;
   collecting performance data for said data processing system;
   determining a performance impact of the utility work on the production work,
      said step for determining a performance impact, comprising:
      determining a baseline for said data processing system;
      determining a performance impact of the utility work on the production work based on said baseline; and
      determining if said performance impact is above said performance impact limit;
      wherein said baseline is an estimate of the performance of said data processing system as if the utility work was not being performed, and wherein said performance impact is the difference between said baseline and said performance data; and
      adjusting said throttling level if said performance impact is more than said performance impact limit.

2. The method as claimed in claim 1, wherein said step for adjusting said throttling level includes increasing said throttling level if said performance impact is above said performance impact limit.

3. The method as claimed in claim 1, further comprising the step of storing said performance data in said memory.

4. The method as claimed in claim 3, further comprising:
   selecting a performance impact limit; and,
   determining a throttling level for said selected performance impact limit.

5. The method as claimed in claim 4, wherein said step for determining a baseline includes modeling said performance data using recursive least squares with exponential forgetting.

6. A computer program product having a computer readable medium tangibly embodying code for directing a data processing system to execute programs for performing production work and utility work, said data processing system being operatively coupled to memory for storing data, said computer program product comprising:
   code for selecting a performance impact limit for the utility work on the production work;
   code for throttling tasks associated with the utility work according to a throttling level;
   code for collecting performance data for the data processing system;
   first determining code for determining a performance impact of the utility work on the production work, said code for determining a performance impact, comprising:
      determining a baseline for said data processing system;
      determining a performance impact of the utility work on the production work utilizing said baseline; and
      determining if said performance impact is above said performance impact limit;
      wherein said baseline includes an estimate of the performance of said data processing system as if the utility work was not operating, and wherein said performance impact comprises the difference between said baseline and said performance data; and
   code for adjusting said throttling level if said performance impact is above said performance impact limit.

7. The computer program product as claimed in claim 6, wherein said code for adjusting said throttling level includes increasing said throttling level if said performance impact is above said performance impact limit.

8. The computer program product as claimed in claim 6, further comprising code for storing said performance data in said memory.

9. The computer program product as claimed in claim 8, further comprising:
   code for selecting a performance impact limit; and,
      second determining code for determining a throttling level for said selected performance impact limit.

10. The computer program product as claimed in claim 9, wherein determining the baseline includes modeling said performance data using recursive least squares with exponential forgetting.

11. A data processing system for optimizing execution of computer programs for performing production work and utility work, said data processing system being operatively coupled to memory for storing data, said data processing system comprising:
    means for selecting a performance impact limit of the utility work on the production work;
    means for throttling tasks associated with the utility work according to a throttling level;
    means for collecting performance data associated with said data processing system;
    first determining means for determining a performance impact of the utility work on the production work based on said collected performance data, said means for determining a performance impact comprising:
       determining a baseline of said data processing system;
       determining a performance impact of the utility work on the production work; and
       determining if said performance impact is above said performance impact limit;
       wherein said baseline includes an estimate of the performance of said data processing system as if said utility work was not being performed, and wherein said performance impact comprises the difference between said baseline and said performance data; and means for adjusting said throttling level if said performance impact is above said performance impact limit.

12. The data processing system as claimed in claim 11, wherein said means for adjusting said throttling level comprises means for increasing the throttling level if said performance impact is above said performance impact limit.

13. The data processing system as claimed in claim 11, further comprising means for storing said performance data in said memory.

14. The data processing system as claimed in claim 13, further composing:
   means for selecting a performance impact limit; and,
   second determining means for determining a throttling level for said selected performance impact limit.

15. The data processing system as claimed in claim 14, wherein determining said baseline includes modeling said performance data using recursive least squares with exponential forgetting.

16. For a data processing system, a method for execution of programs for performing a primary work type and a secondary work type, the method comprising the steps of:
   throttling tasks associated with the secondary work type based on a throttling level;
   adjusting the throttling level based on a performance impact of the secondary work type on the primary work type;
   selecting a performance impact limit of the secondary work type on the primary work type;
   determining the performance impact of the secondary work type on the primary work type; said determining the performance impact of the secondary work type on the primary work type, comprising:
      determining a baseline of said data processing system;
      determining a performance impact of the secondary work type on the primary work type work; and
      determining if said performance impact is above said performance impact limit;
      wherein said baseline includes an estimate of the performance of said data processing system as if said secondary work type was not being performed, and wherein said performance impact comprises the difference between said baseline and said performance data; and
   adjusting the throttling level if the determined performance impact is more than the selected performance impact limit.

17. The method of claim 16 further comprising collecting performance data for the data processing system.

18. The method of claim 16 wherein the primary work type is production work and the secondary work type is utility work.

19. A data processing system for execution of programs for performing a primary work type and a secondary work type, the data processing system comprising:
   means for throttling tasks associated with the secondary work type based on a throttling level;
   means for adjusting the throttling level based on a performance impact of the secondary work type on the primary work type;
   means for selecting a performance impact limit of the secondary work type on the primary work type;
   means for determining the performance impact of the secondary work type on the primary work type; said means for determining the performance impact of the secondary work type on the primary work type, comprising:
      means for determining a baseline of said data processing system;
      means for determining a performance impact of the secondary work type on the primary work type work; and
      means for determining if said performance impact is above said performance impact limit;
      wherein said baseline includes an estimate of the performance of said data processing system as if said secondary work type was not being performed, and wherein said performance impact comprises the difference between said baseline and said performance data; and,
   means for adjusting the throttling level if the determined performance impact is more than the selected performance impact limit.

20. The data processing system of claim 19 further comprising means for collecting performance data for the data processing system.

21. The data processing system of claim 19 wherein the primary work type is production work and the secondary work type is utility work.

22. A computer program product having a computer readable medium tangibly embodying computer executable code for directing a data processing system to execute programs for performing a primary work type and a secondary work type, the computer program product comprising:
   code for throttling tasks associated with the secondary work type based on a throttling level;
   code for adjusting the throttling level based on a performance impact of the secondary work type on the primary work type;
   code for selecting a performance impact limit of the secondary work type on the primary work type;
   code for determining the performance impact of the secondary work type on the primary work type; said code for determining the performance impact of the secondary work on the primary work type, comprising:
      determining a baseline of said data processing system;
      determining a performance impact of the secondary work type on the primary work type work; and
      determining if said performance impact is above said performance impact limit;
      wherein said baseline includes an estimate of the performance of said data processing system as if said secondary work type was not being performed, and wherein said performance impact comprises the difference between said baseline and said performance data; and
   code for adjusting the throttling level if the determined performance impact is more than the selected performance impact limit.

23. The computer program product of claim 22 further comprising code for collecting performance data for the data processing system.

24. The computer program product of claim 23 wherein the primary work type is production work and the secondary work type is utility work.

* * * * *